(12) United States Patent
Gates et al.

(10) Patent No.: US 6,958,128 B2
(45) Date of Patent: Oct. 25, 2005

(54) DYNAMIC MIXER SCREW TIP

(75) Inventors: Thomas A. Gates, Parma, MI (US); James N. Valentine, Rives Junction, MI (US); David H. Steele, Jackson, MI (US); Steven H. Bowens, West Chester, PA (US)

(73) Assignee: CertainTeed Corporation, Valley Forge, PA (US)

( * ) Notice: Subject to any disclaimer, the term of this patent is extended or adjusted under 35 U.S.C. 154(b) by 19 days.

(21) Appl. No.: 10/719,737

(22) Filed: Nov. 21, 2003

(65) Prior Publication Data

US 2005/0111294 A1   May 26, 2005

(51) Int. Cl.[7] .............................................. B29C 47/64
(52) U.S. Cl. ................ 264/211.21; 366/81; 366/85; 366/90; 425/204; 425/208; 425/209
(58) Field of Search ................ 366/81, 85, 90, 366/322–324; 425/204, 208, 209; 241/260.1, 241/261.1; 264/211.21, 211.22, 211.23

(56) References Cited

U.S. PATENT DOCUMENTS

| | | | | |
|---|---|---|---|---|
| 203,284 A | * | 5/1878 | McKenzie | .................. 425/208 |
| 485,854 A | * | 11/1892 | Woodruff | ..................... 241/247 |
| 2,453,088 A | * | 11/1948 | Dulmage | ....................... 366/82 |
| 2,622,469 A | * | 12/1952 | Gray | ........................ 264/176.1 |
| 3,555,616 A | * | 1/1971 | Parks | .......................... 425/209 |
| 3,902,850 A | * | 9/1975 | Lehnert | ....................... 422/133 |
| 3,942,774 A | | 3/1976 | Sokolow | |
| 3,945,622 A | | 3/1976 | Sokolow | |
| 4,017,241 A | * | 4/1977 | Papinchak et al. | .......... 425/237 |
| 4,425,044 A | | 1/1984 | Kurtz et al. | |
| 4,988,281 A | | 1/1991 | Heathe et al. | |
| 5,670,112 A | | 9/1997 | Csongor et al. | |
| 5,951,159 A | | 9/1999 | Schobert-Csongor et al. | |
| 6,132,076 A | | 10/2000 | Jana et al. | |
| 6,136,246 A | | 10/2000 | Rauwendaal et al. | |
| 6,241,375 B1 | | 6/2001 | Wang | |
| 6,454,454 B1 | | 9/2002 | Barr | |
| 2003/0206482 A1 | * | 11/2003 | Griggs | ........................ 366/81 |

FOREIGN PATENT DOCUMENTS

JP           9-76326        *    3/1997

OTHER PUBLICATIONS

Rockwell Automation, Extrusion Processes, Publication D-7741, Mar. 2000.

* cited by examiner

Primary Examiner—David Sorkin
(74) Attorney, Agent, or Firm—Duane Morris LLP (57) ABSTRACT

The present invention includes a screw tip for an extruder screw for effecting mixing in an extruder. The screw tip has a substantially conical outside surface and at least one discontinuous fin. The at least one fin protrudes from the outside surface of the screw tip.

21 Claims, 6 Drawing Sheets

DYNAMIC MIXER SCREW TIP

FIELD OF THE INVENTION

The present invention relates to extrusion devices, and more particularly to screw tips for use in extruders.

BACKGROUND OF THE INVENTION

Extruders are commonly used in order to form various types of products (e.g., blown film, pipe, coated paper, plastic filaments, carpet fiber, and vinyl siding) from thermoplastic materials, such as polyvinylchloride, polyethylene or polypropylene, for example. The extruder carries out an extrusion process whereby a solid plastic (or resin), which is often in the form of beads, pellet or powder form, is compressed, melted (plasticized) and mixed while being carried along by a feedscrew, after being fed into a barrel chamber which houses the feedscrew. Ultimately, a resin, which is expectantly homogenized, is forced out of the extruder through a die, which, depending on its design and other downstream equipment, forms the resin into the particular desired shape.

Depending on the application, the plastic material is often compounded with other chemicals prior to formation of the plastic material into pellets or beads. These chemicals, which may vary in amount, include, for example, stabilizers, lubricants, dyes or other colorants, plasticizers, fillers, and other additives which may add or enhance certain desirable product properties. In order to obtain the desired properties throughout the final product, it is important that the additives, such as those listed, are evenly distributed and dispersed in the extrudate as it enters the die.

Figure 1:
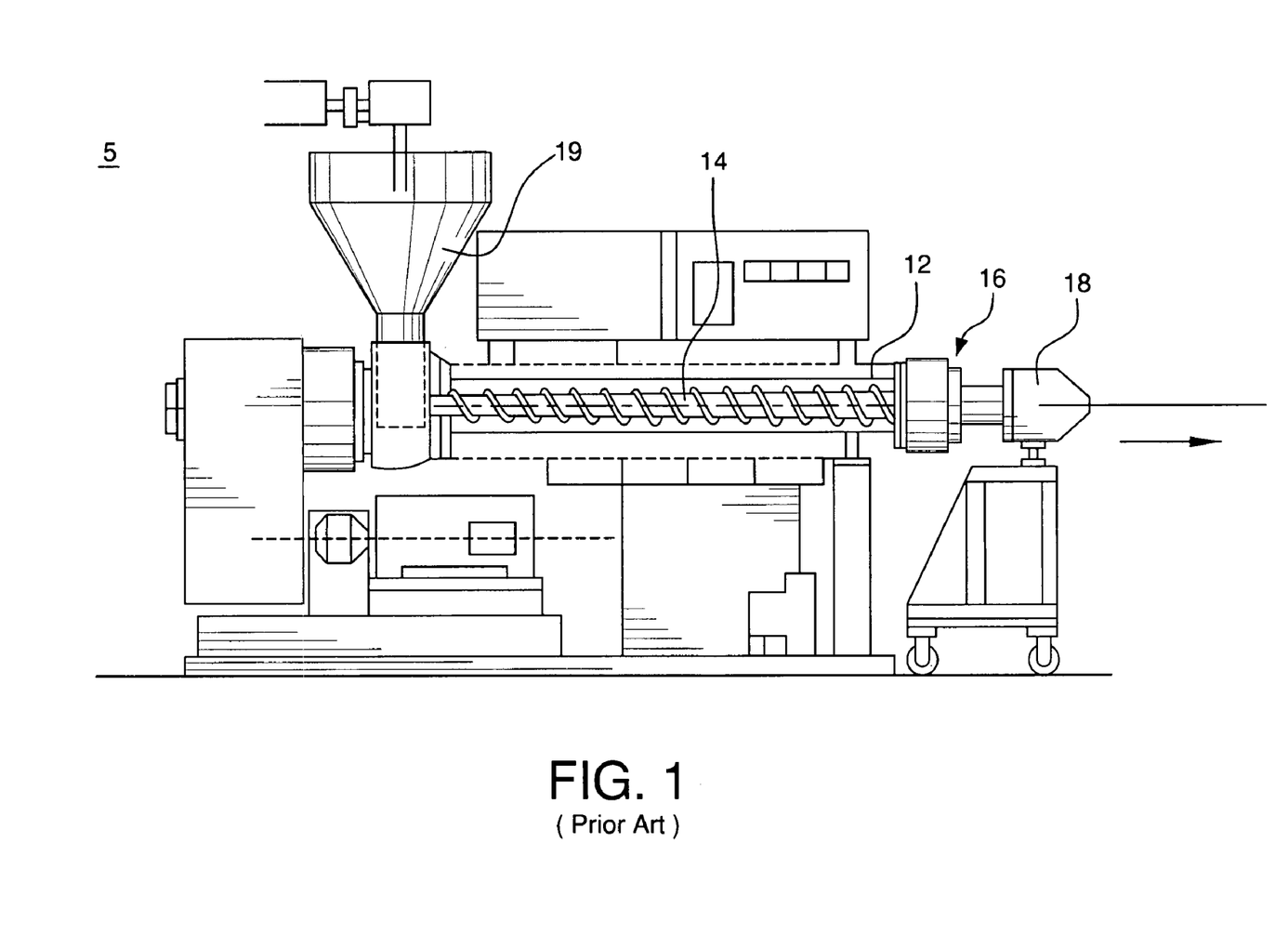
FIG. 1 is a side elevational view of a prior art extruder.

Referring to FIG. 1, a prior art single screw extruder machine 5 is shown comprising a barrel 12, a feedscrew 14, an adapter 16, a die 18, and a hopper 19. The barrel 12 is typically a thick-walled steel chamber that is machined to have a tight fit with the feedscrew 14. The feedscrew 14, which is usually the only moving part in the extruder, generally includes at least three defined sections: a feed zone, a compression zone, and a metering zone, each zone varying, for example, in channel depth, distance between flights, and flight patterns. The feed zone takes resin from a hopper 19 and conveys it along the initial part of the barrel chamber. During this conveyance, the resin pellets encounter friction from the feedscrew surface, the barrel surface and from other pellets, resulting in heat which begins to melt the resin. In the compression zone, the channel depth between screw flights usually diminishes resulting in the pressurization of the melting resin and hopefully the completion of the melting process. The metering zone generally serves to further mix the molten resin, hopefully resulting in a homogenized resin with a uniform temperature.

The feedscrew 14 typically has a smooth conical tip, which is enclosed within the adapter 16. The adapter 16 serves as a connection between the barrel 12 and the die 18. It often houses a breaker plate (which breaks the helical flow of the molten resin into a linear flow) and a screen pack (which filters out foreign particles).

Generally, there are two important types of mixing that the screws effectuate in an extruder in order to reduce the non-uniformity of the material or materials being extruded. These two types of mixing, which basically serve to induce relative physical motion in the ingredients of the extrudate, are distributive mixing and dispersive mixing. The combination of both dispersive and distributive mixing will achieve a more uniform overall mixture.

Distributive mixing increases the randomness of the spatial distribution of particles without reducing the size of the particles. It is effectuated by a continuous reorientation of the material being mixed.

Dispersive mixing serves to reduce the size of cohesive particles as well as randomizing their positions. In extrusion processes, dispersive mixing is usually more important than distributive mixing. This is especially true, for example, in the extrusion of compounds which contain colorant pigment agglomerates, which must be uniformly mixed into the extrudate. In dispersive mixing, solid components, such as agglomerates, or high viscosity droplets, are exposed to sufficiently high stresses to cause them to exceed their yield stress, thus causing the agglomerates or droplets to be broken down into smaller pieces. Depending upon the type of material being extruded, including the size, shape, and chemical bonding, varying amounts of stress will be required to break up these materials. The stress which breaks up the agglomerate may either be shear stress or elongational stress. Generally, elongational stress, which is generated by elongational flow or stretching, is more efficient in effectuating dispersion of the material than shear stress, which is caused by the sliding of the material across itself.

In order to enhance the distributive and dispersive mixing in extruders, extruder screws having numerous variations in design have been employed. Extruder screws usually have a standard screw section near the material input hopper, and one or more specially designed sections to enhance distributive and dispersive mixing. To enhance distributive mixing, for example, distributive mixing elements such as pins placed between screw flights, or channels which divide the polymer flow into many narrow channels which are combined and re-divided, are employed. These types of elements generally do not provide regions of high stress and thus serve mainly to spatially redistribute material.

In order to enhance dispersive mixing, i.e., to break up and disperse the agglomerates, screws are employed which have high shear stress or elongational stress regions. For example, screws may be used having a fluted or splined mixing section, in which one or more barrier flights or blister rings are placed along the screw so that the material has to flow over the barriers.

The above described distributive and dispersive mixing elements or regions are typically located at one or more areas on the screw, and thus the mixing is performed in the barrel of the screw extruder. Little, if any, mixing typically occurs in the area of the adapter, which typically encloses the screw tip. As such, the adapter is a location where stagnation of the molten resin may occur potentially resulting in incomplete mixing, heat gradients, and therefore decomposition, degradation or burning of the material, as well as a generation of excessive head pressure, which limits output.

U.S. Pat. No. 3,942,774 to Sokolow describes a screw tip located in an adapter of a screw extruder which includes transfer grooves for enhancing redistributive mixing in the adapter area. The transfer grooves of the screw tip work in combination with feeder grooves in the inside surface of the adapter to effectuate the redistributive mixing. The constraint of having to replace the adapter in order for the screw tip to work effectively inhibits the ability of the screw tip to be used with existing adapters.

What is desired is an improved screw tip for extruders.

SUMMARY OF THE INVENTION

According to one aspect of the present invention, a screw tip for an extruder screw for effecting mixing in an extruder is disclosed comprising a substantially conical outside surface and at least one discontinuous fin. The at least one fin protrudes from the outside surface of the screw tip.

The discontinuous fin, or fins, of the screw tip aids in increasing the distributive and dispersive mixing of the thermoplastic materials, and any additives, being extruded. Further, the discontinuous fins aid in preventing stagnation and heat gradients in the adaptor area, which can result in decomposition, degradation or burning of the thermoplastic material. Also, generation of excessive head pressure, which limits output, is advantageously reduced.

According to another aspect of the present invention an extruder for extrusion of thermoplastic materials is disclosed comprising a hollow barrel defining a feed channel, at least one extruder screw rotatably mounted in the feed channel, and at least one screw tip coaxially mounted on a respective extruder screw. The screw tip includes at least one discontinuous fin extending from a substantially conical outside surface.

According to another aspect of the present invention an extrusion process is disclosed comprising mixing a molten material with a rotating screw tip. The screw tip has fins protruding from a substantially conical outside surface, at least one of which is discontinuous.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. As used herein, the term "discontinuous" means having a slot or groove therein which interrupts the outer edge 43 of the fin or fins 42 of the preferred embodiments. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
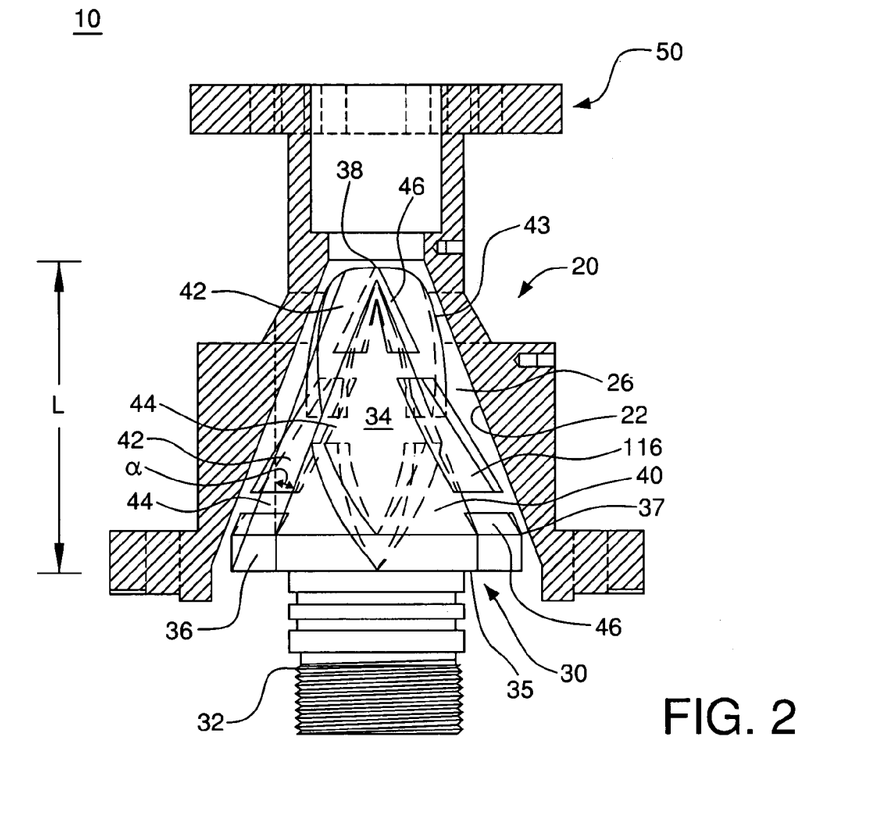
FIG. 2 is cross sectional side view of an adaptor shown enclosing a screw tip according to one embodiment of the present invention, the screw tip shown in side elevation.

FIG. 2 is a longitudinal section elevational view of an exemplary embodiment of a portion of an extruder 10, such as may be employed for injecting thermoplastic materials into an injection molding machine. The extruder portion 10 comprises an adapter 20 and a screw tip 30. The adapter 20 may be integral with or associated with an extrusion die 50. The screw tip 30 may be constructed integrally with a screw (not shown) as a one-piece structure, but preferably is formed as a separate part which may be concentrically attached to the end of a screw. Although this version of an exemplary embodiment has a single screw tip for use in a single screw extruder, it is to be understood that the extruder could contain two or more screws and thus, two or more screw tips, without departing from the scope of the invention. For example, the screw tip exemplified in FIGS. 2–4 could be used in a twin screw extruder, similar to that shown in FIG. 6.

The adapter 20, which serves as a connection between the barrel (not shown) of the extruder and the die 50, has a preferred conical inside surface 22, which is complimentary to and conforms to the conical form of the screw tip as described below. As indicated by the arrow in FIG. 2, the adapter 20 advances and conveys the thermoplastic material from the extruder barrel towards the die 50 or other contoured orifice where the material will be shaped into the desired form, such as, for example, a pipe, sheet or film.

Figure 3:
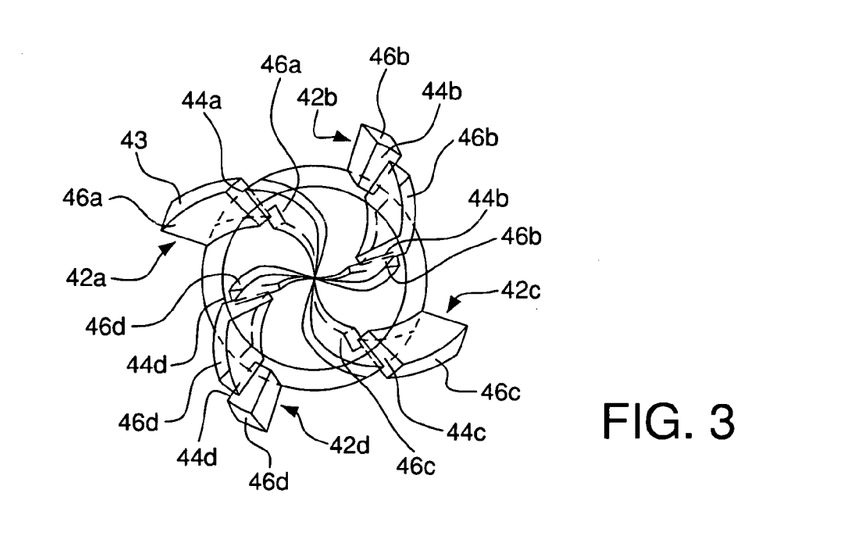
FIG. 3 is a top plan view of the screw tip of FIG. 2.
Figure 4:
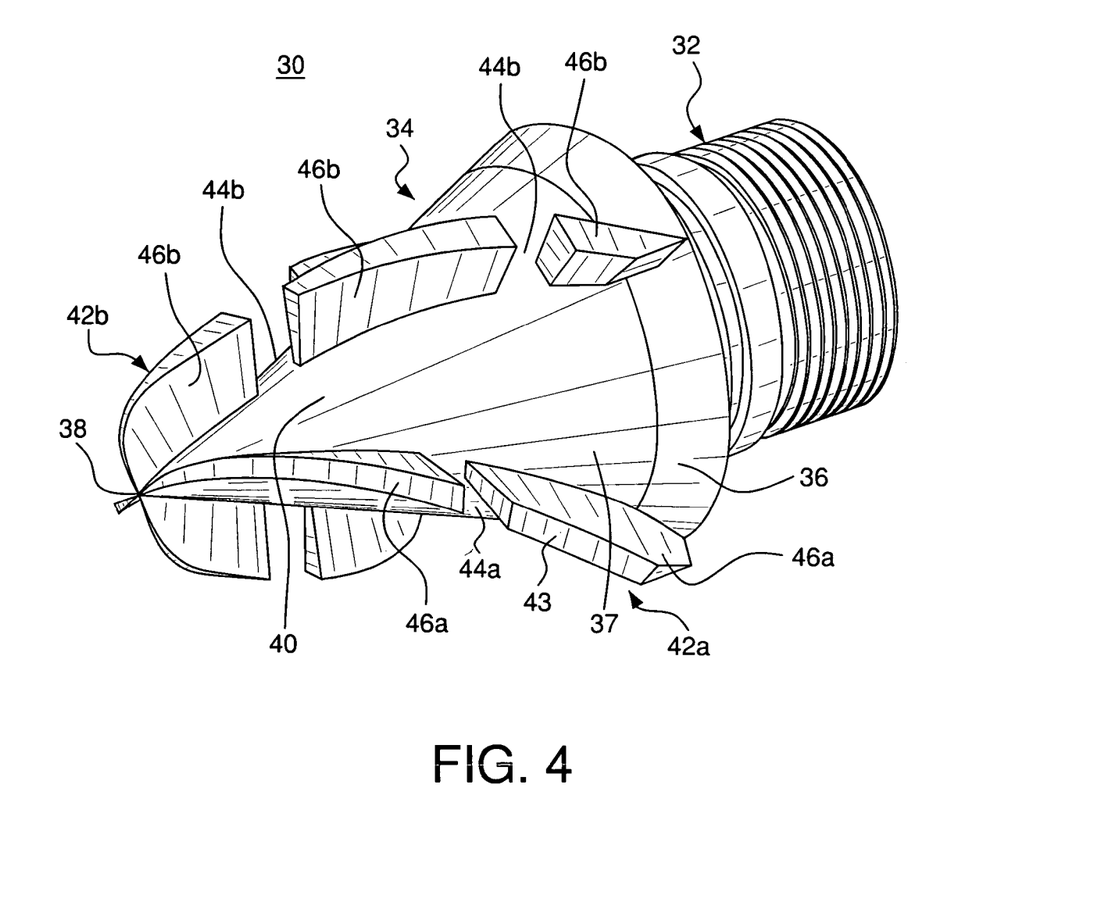
FIG. 4 is an isometric view of the screw tip of FIG. 2.

Referring to FIGS. 2–4, screw tip 30 comprises an attachment portion 32 and a tip portion 34. The attachment portion 32 is preferably threaded for allowing coaxial attachment to a complimentary threaded screw. Tip portion 34 includes a base portion 36, an apex 38, a substantially conical outside surface 40, fins 42, and slots 44, grooves or valleys, that divide the fins 42 into individual fin components 46, or otherwise render them "discontinuous". Said slots, grooves or valleys may or may not cut through the entire height of the fin.

The outside surface 40 of the screw tip 30 preferably has a slope angle α of less than 30 degrees from a downstream edge 37 of the base portion 36 to the apex 38 of the screw tip 30, although such slope angle is preferably dependent on and complementary to the slope angle of the inside surface of the adapter. The outside surface 40 is substantially conical in shape. Protruding from the outside surface 40 are a plurality of fins 42 which are preferably tapered complimentary to the conical shape of the outside surface 40. The outer edge 43 of the fins 42 closely approaches the conical inside surface 22 of the adapter, thus allowing the tip portion 34 of the screw tip 30 to substantially fill the channel 26 in the adapter 20.

In the embodiment shown in FIGS. 2–4, there are four fins 42, at 90 degree angles from one another. However, there may alternatively be one, two, three, five or more than five fins on the screw tip 30. The fins 42 preferably extend substantially from an upstream edge 35 of the base portion 36 to the apex 38 of the tip portion 34. Preferably, the outer edge 43 of the fins 42 decreases in width from the base portion 36 to the apex 38.

The fins 42 preferably include at least one slot 44 which divides each respective fin 42 into fin components 46. In the exemplary embodiment of FIGS. 2–4, the two opposing fins 42a, 42c have one slot 44a, 44c, and the two other opposing fins 42b, 42d have two slots 44b, 44d. The slots 44a, 44c divide fins 42a, 42c each into two fin components 46a, 46c. The slots 44b, 44d divide fins 42b, 42d each into three fin components 46b, 46d.

Figure 5:
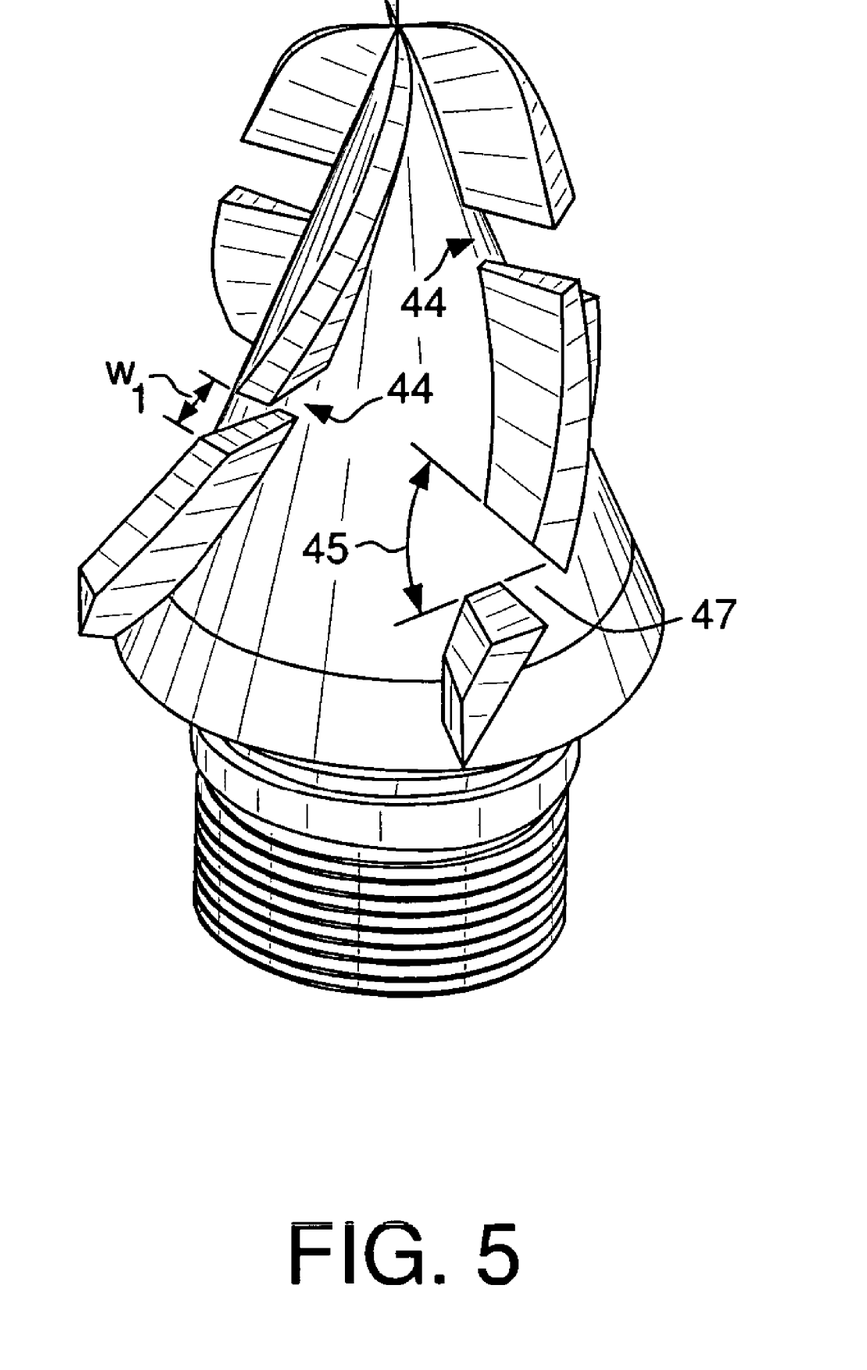
FIG. 5 is an isometric view of an alternative embodiment of a screw tip.

The discontinuity, for example, slots 44, aids in increasing distributive mixing. The number of slots 44 and placement of the slots 44 relative to one another are subject to considerable variation and may vary depending upon the type and properties of the materials being extruded. Further, also depending upon the properties of the material being extruded and the mixing desired, the width $W_1$ of the slots 44 may vary, as well as the angle and depth of the slots. Preferably, the width W1 of the slots is between about 7–10 percent of the length L of the tip portion 34. For example, where the length of the tip portion 34 of the screw tip is approximately 4½ inches, the width $W_1$ of the slots is preferably between about 0.3–0.4 inches. Additionally, the slots 44 may have a taper angle 45, as shown in FIG. 5 which provide narrowing channels 47, which create regions of high elongational stress to aid in dispersive mixing.

The fins 42 have curved side walls, and are preferably helical and may either have a right hand pitch (as illustrated in FIGS. 2–4) or a left hand pitch. The helical nature of the preferred fins may aid in the dispersive mixing of the materials or in increasing the output through the adapter, depending on the direction of the pitch. In one pitch direction, the fins will effectively push the flow of material through the die to increase the output through the extruder. In the opposite pitch direction, the fins will restrict flow into the die and thus increase mixing by forcing the material through the slots. The extent or angle of the pitch is subject to considerable variation which may be dependent upon the type and properties of the materials being extruded.

The dimensions of the screw tip may vary depending on the dimensions of the screw and the dimensions of the adapter. As stated above, preferably the outer edge 43 of the fins 42 closely approaches the inside surface 22 of the adapter 20 allowing the fins 42, in effect, to scrape the inside surface 22 of the adapter 20, which aids in preventing any stagnant material in the adaptor, and which, in turn, aids in breaking up any potentially harmful temperature gradients, which could degrade the material being extruded. The existence and configuration of the fins also enables the distributive and dispersive mixing to continue through the adapter area, which is helpful in completing any potentially incomplete mixing.

Figure 6:
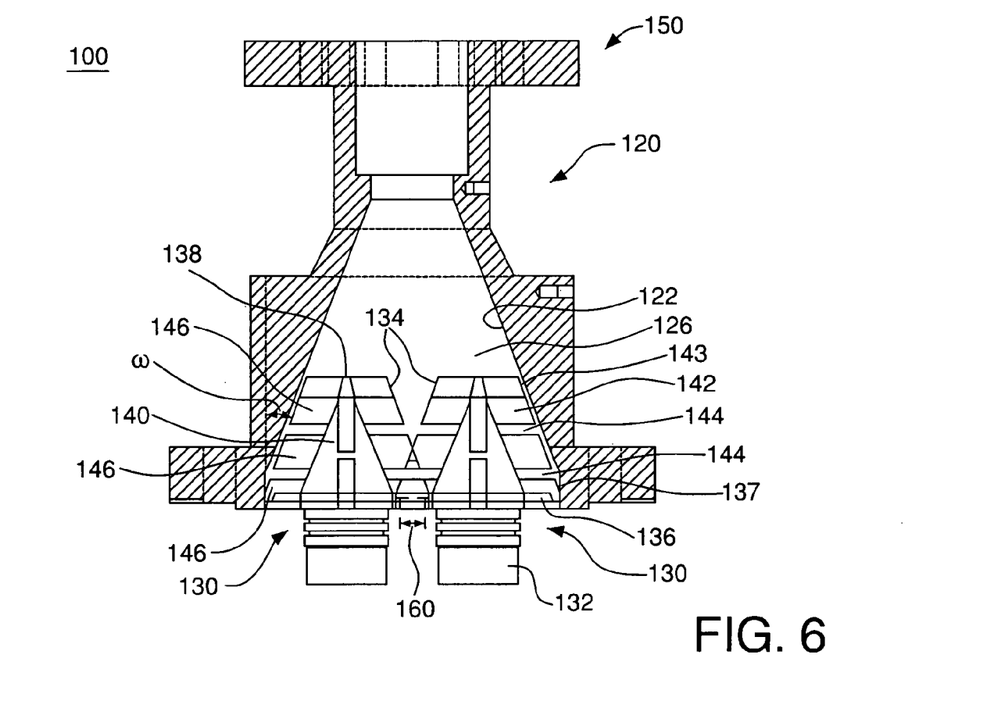
FIG. 6 is a cross sectional side view of an adapter shown enclosing screw tips according to another embodiment of the present invention, the screw tips shown in side elevation.

FIG. 6 is a longitudinal section elevational view of another exemplary embodiment of a portion of an extruder 100. The extruder portion 100 comprises an adapter 120 and two screw tips 130. As with the embodiment shown in FIG. 2, the adapter 120 may be integral with or associated with an extrusion die 150. The screw tips 130 may be constructed integrally with respective screws (not shown) as a one-piece structure, but preferably are formed as a separate part which may be concentrically attached to the end of a respective screw. Although this exemplary embodiment illustrates two screw tips for use in a twin screw extruder, it is to be understood that the extruder could contain a single screw or more than two screws, and thus, a single screw tip or more than two screw tips, without departing from the scope of the invention. For example, the screw tips exemplified in FIGS. 6–9 could be used in a single screw extruder, similar to that shown in FIG. 2.

Figure 7:
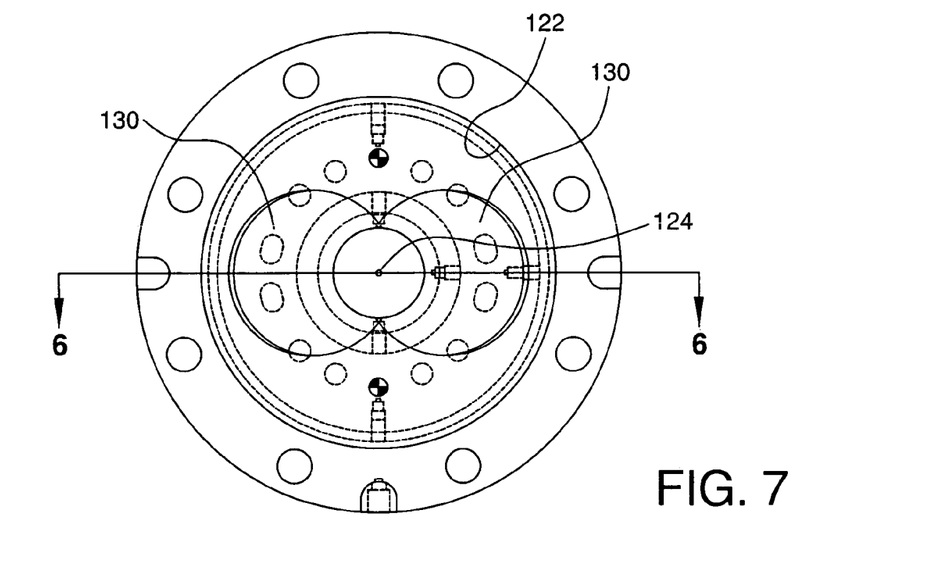
FIG. 7 is a top schematic view of the adaptor and screw tips of FIG. 6.
Figure 8:
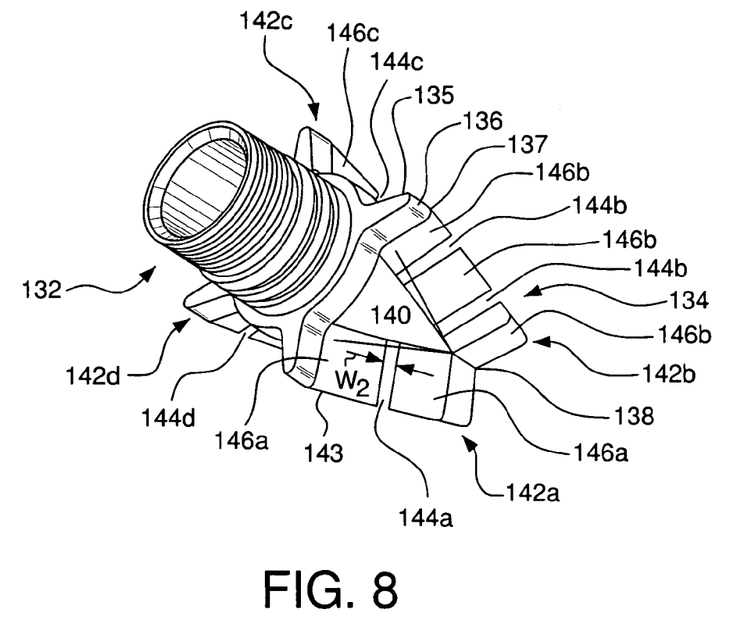
FIG. 8 is an isometric view of one of the screw tips of FIG. 6.

The adapter 120, which serves as a connection between the barrel (not shown) of the extruder and the die 150, has a conical inside surface 122, with an angle that is complementary to the angle of the screw tips 130 as described below. Unlike the embodiment of FIGS. 2–5, where the tip portion 34 of the screw tip 30 in a single screw extruder substantially fills the channel 126 of the adapter 20, the configuration of the twin screws of the illustrated embodiment of FIGS. 6–9, as best shown by FIG. 7, does not enable the screw tips 130 to substantially fill the adapter channel 26. However, due to the presence of the mixing elements (i.e., fins and slots) on the screw tips 130, dispersive and distributive mixing is still effectuated in the adapter area helping to prevent stagnation in the adapter area and the resultant problems associated therewith, as well as facilitating the completion of any incomplete mixing.

Referring to FIGS. 6–9, screw tips 130 comprise an attachment portion 132 and a tip portion 134. The attachment portions 132 are preferably threaded to allow coaxial attachment to complementary threaded screws. Tip portion 134 includes a base portion 136, an apex 138, a substantially conical outside surface 140, fins 142, and slots 144 that divide the fins 142 into individual fin components 146.

The outside surface 140 of the tip portion 134 preferably has a slope angle ω of less than 30 degrees from a downstream edge 137 of the base portion 136 to the apex 138 of the tip portion 134, although such slope angle is preferably dependent on and complementary to the slope angle of the inside surface of the adapter. The outside surface 140 is substantially conical in shape. Protruding from the outside surface 140 are a plurality of fins 142 which are preferably tapered complementary to the conical shape of the outside surface 140. The outer edge 143 of a fin 142, when it is furthest from the center 124 of the adapter, preferably closely approaches the conical inside surface 122 of the adapter.

Figure 9:
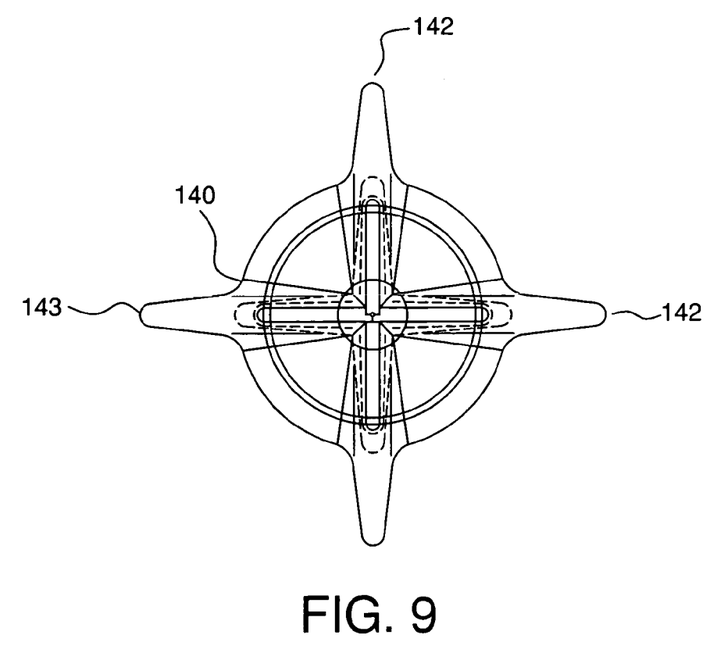
FIG. 9 is a top plan view of the screw tip of FIG. 8.

In the embodiment shown in FIGS. 6–9, there a four fins 142, at 90 degree angles from one another. However, there may alternatively be more than four fins or less than four fins on the screw tip 130. The fins 142 preferably extend substantially from an upstream edge 135 of the base portion 136 to the apex 138 of the tip portion 134. Preferably, the width of the outer edge 143 of the fins 142 is substantially consistent from the base portion 136 to the apex 138, although such width may vary as with the fins 42 of the embodiment of FIGS. 2–5. As best shown in FIG. 9, the fins 142 may decrease in width from the point of attachment to the outside surface 140 to the outer edge 143. The fins 142 in this embodiment are substantially straight from the base portion 136 to the apex 138.

The fins 142 preferably include at least one slot 144 which divides each respective fin 142 into fin components 146. In the exemplary embodiment of FIGS. 6–9, the two opposing fins 142a, 142c have one slot 144a, 144c, and the two opposing fins 142b, 142d have two slots 144b, 144d. The slots 144a, 144c divide fins 142a, 142c each into two fin components 146a, 146c. The slots 144b, 144d divide fins 142b, 142d each into three fin components 146b, 146d.

As stated with respect to the embodiment of FIGS. 2–5, the geometry and number of slots 144 and placement of the slots 144 relative to one another are subject to considerable variation and may vary depending upon the type and properties of the materials being extruded. Further, also depending upon the properties of the material being extruded and the mixing desired, the width $W_2$ of the slots 144 may vary, as well as the angle of the slots. Additionally, the slots 144 may have a taper angle, as described with respect to the embodiment of FIG. 5, which provides narrowing channels, which in turn create regions of high elongational stress to further aid in distributing and dispersing the materials being extruded.

The dimensions of the screw tip 130 may vary depending on the dimensions of the screw and the dimensions of the adapter 120. Referring to FIGS. 6 and 7, the axes of the two screw tips are parallel to one another and the fins 142 of the two screw tips 130 overlap in an overlap area 160 at the center 124 of the adapter channel 126. The screw tips 130 may rotate in the same direction or may be counter-rotating.

According to another aspect of the present invention, a process for extruding a molten material, especially thermoplastic materials, comprises mixing a molten material with a rotating screw tip having fins extending from a substantially conical outside surface of the screw tip. As described above, the mixing is enhanced by the presence of one or more slots which divide the fins into fin components. The mixing elements, i.e., fins and slots, continue the mixing process, which begins in the barrel of the extruder, through the adapter which encloses the screw tip.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A screw tip for an extruder screw for effecting mixing in an extruder comprising:
    a substantially conical outside surface, and
    a plurality of discontinuous fins protruding from the outside surface of the screw tip,
    wherein a first pair of opposing fins include a first number of fin slots which divide each fin of the first pair of fins into a first number of fin components, and wherein a second pair of opposing fins include a second number of one or more fin slots which divides each fin of the second pair of fins into a second number of fin components different from the first number of fin components.

2. The screw tip of claim 1, wherein the screw tip includes a tip portion and an attachment portion, and wherein at least one of the fins extends substantially from a base of the tip portion to an apex of the tip portion.

3. The screw tip of claim 1, wherein the slots of the first pair of fins are not aligned with the slots of the second pair of fins.

4. The screw tip of claim 1, wherein the slots have a taper angle which forms a narrowing channel.

5. The screw tip of claim 1, wherein the screw tip includes a tip portion, and wherein the width of the slots is approximately between 6–10 percent of the length of the tip portion.

6. The screw tip of claim 5, wherein the screw tip includes a tip portion having length of between about 4–4½ inches, and wherein the slots have a width of between about 0.3–0.4 inches.

7. The screw tip of claim 1, wherein the outer surface is smooth.

8. The screw tip of claim 1, wherein at least one of the plurality of discontinuous fins has a curved sidewall portion.

9. The screw tip of claim 1, wherein a first pair of opposing fins include two fin slots which divide each fin of the first pair of fins into three fin components, and wherein a second pair of opposing fins include one fin slot which divides each fin of the second pair of fins into two fin components.

10. The screw tip of claim 1, wherein the outside surface of the screw tip has a slope of less than thirty degrees from a base portion of the screw tip to an apex of the screw tip.

11. The screw tip of claim 1, wherein each fin is helical in shape.

12. The screw tip of claim 1, wherein each fin is straight.

13. An extruder for extrusion of thermoplastic materials comprising:
    a hollow barrel defining a feed channel;
    at least one extruder screw rotatably mounted in the feed channel; and
    at least one screw tip coaxially mounted on a respective extruder screw and having a plurality of discontinuous fins extending from a substantially conical outside surfaces,
    wherein a first pair of opposing fins include a first number of fin slots which divide each fin of the first pair of fins into a first number of fin components, and wherein a second pair of opposing fins include a second number of one or more fin slots which divides each fin of the second pair of fins into a second number of fin components different from the first number of fin components.

14. The extruder of claim 13, wherein the slots of the first pair of fins are not aligned with the slots of the second pair of fins.

15. An extrusion process of the type by which a polymeric material is fed by a screw mixer through a feed channel to a die, the improvement comprising:
    mixing a molten material with a rotating screw tip having a plurality of fins protruding from a substantially conical outside surface of the screw tip, at least four of said fins being discontinuous, wherein a first pair of opposing fins include a first number of fin slots which divide each fin of the first pair of fins into a first number of fin components, and wherein a second pair of opposing fins include a second number of one or more fin slots which divides each fin of the second pair of fins into a second number of fin components different from the first number of fin components.

16. The process of claim 15 further comprising advancing the molten material through an adapter, wherein the adapter encloses the screw tip.

17. The process of claim 15, wherein the molten material is mixed by at least one slot on the fins of the screw tip.

18. The process of claim 15, wherein said molten material is subsequently formed into a building material.

19. The process of claim 18, wherein said building material is siding, decking, fence, rail, guard rail, plank, board, structural lumber, stair tread, riser, kick plate, pipe, window, framing, sill, jamb stile, track, roofing, flooring, decorative millwork, multi-grained stain appearance products, trim, soffit, or fascia materials.

20. The process of claim 15, wherein said molten material comprises a thermoplastic selected from the group of polyvinyl chloride, polyethylene, polypropylene polymers and copolymers.

21. The process of claim 15, wherein the slots of the first pair of fins are not aligned with the slots of the second pair of fins.

* * * * *